Feb. 10, 1959           J. G. KAY           2,873,020
STORAGE AND DELIVERY APPARATUS
Filed Nov. 19, 1956           12 Sheets-Sheet 1
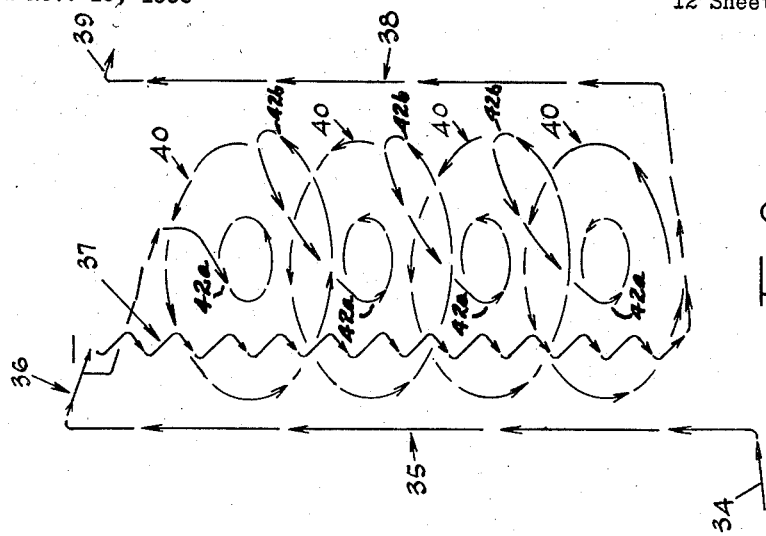
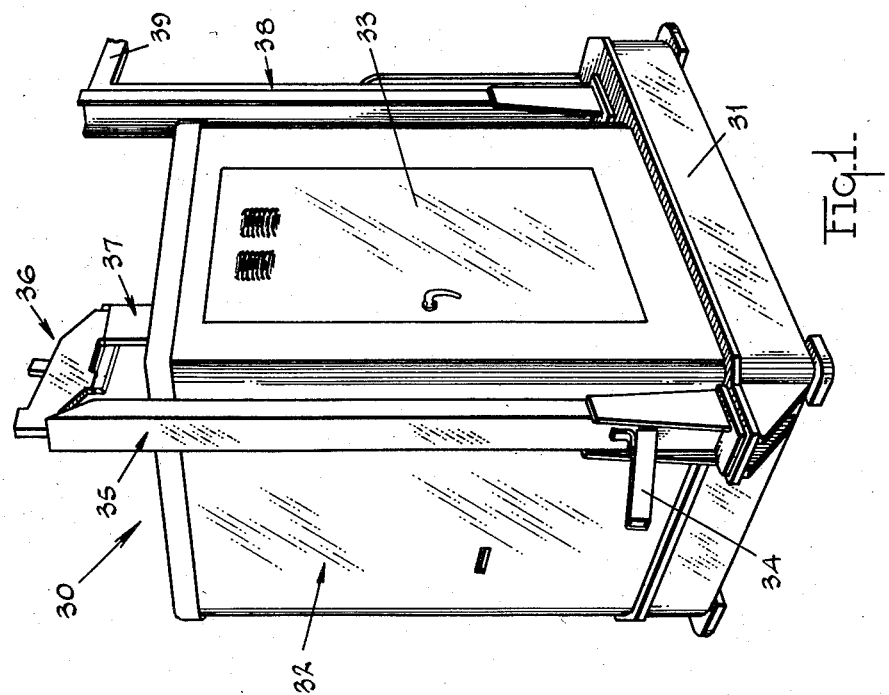
Inventor
John G. Kay
By Barnes, Kisselle, Laughlin & Raisch
Attorneys

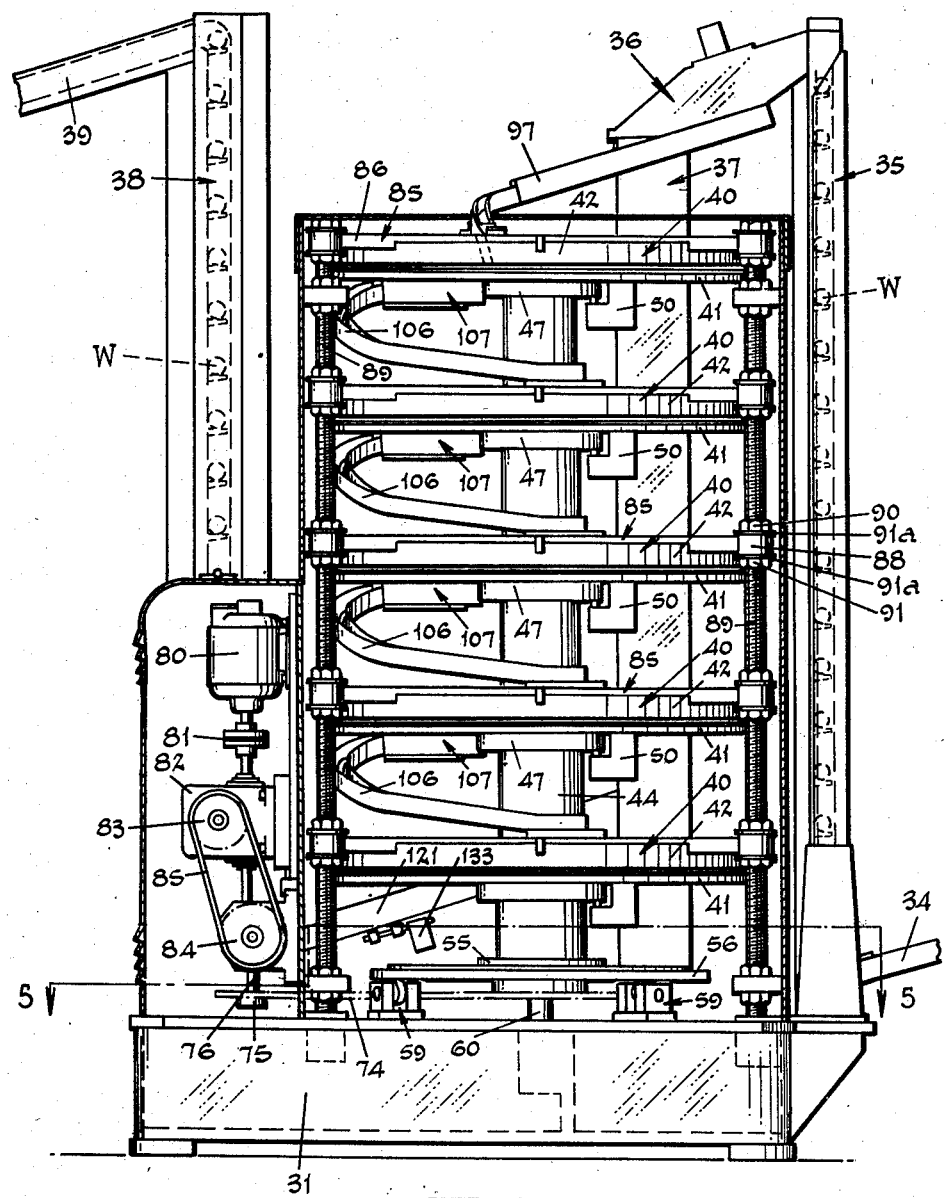

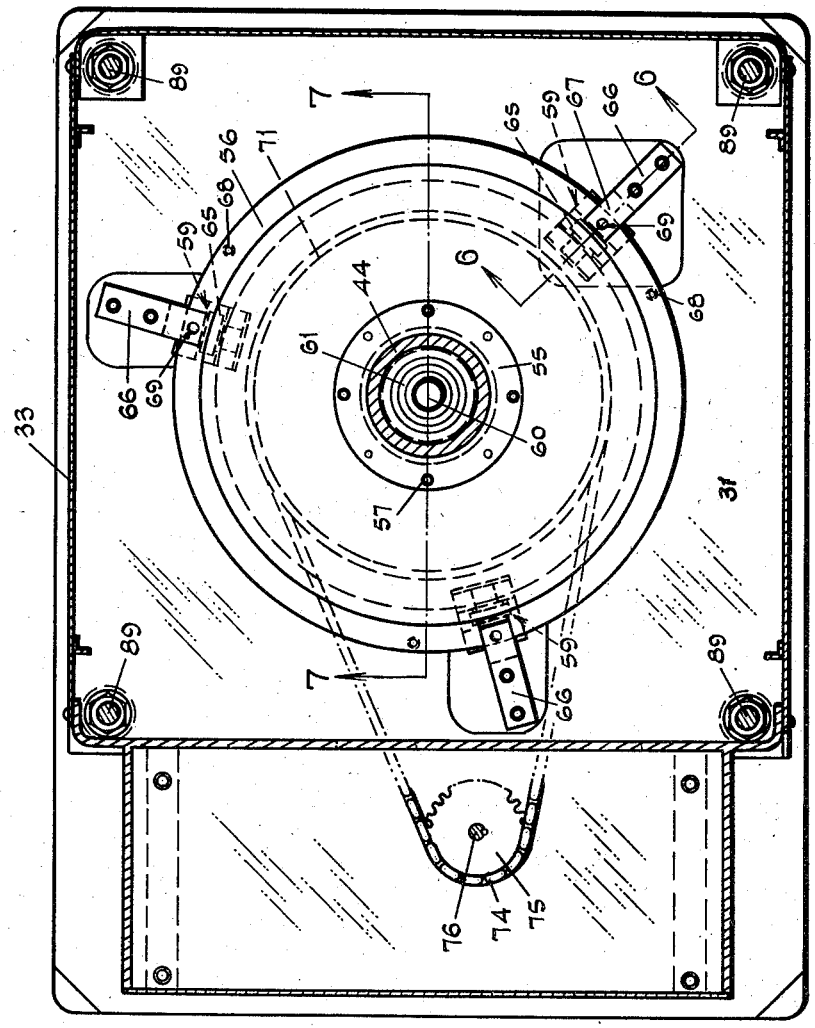
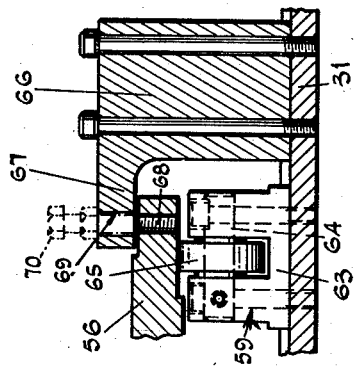

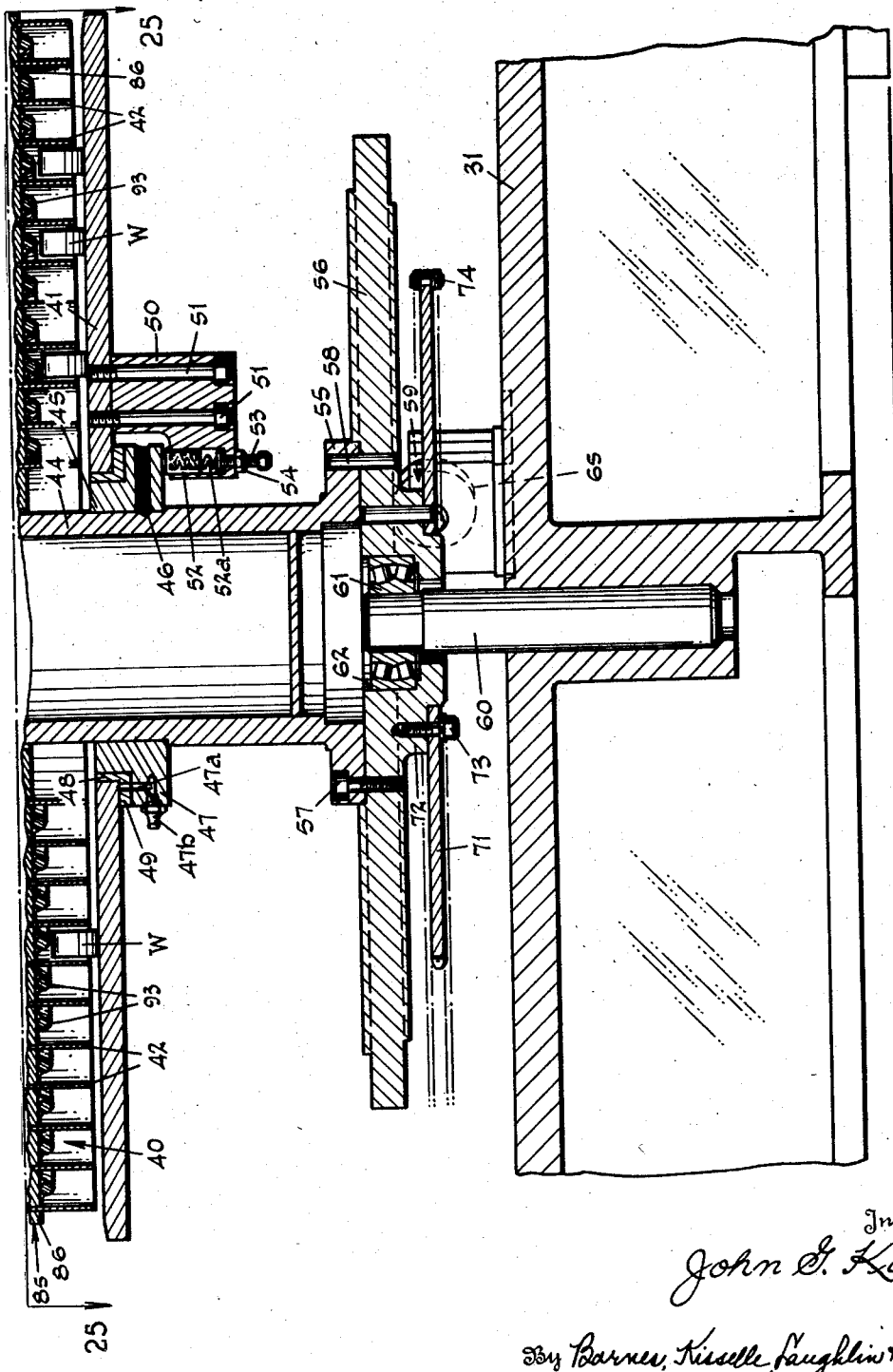

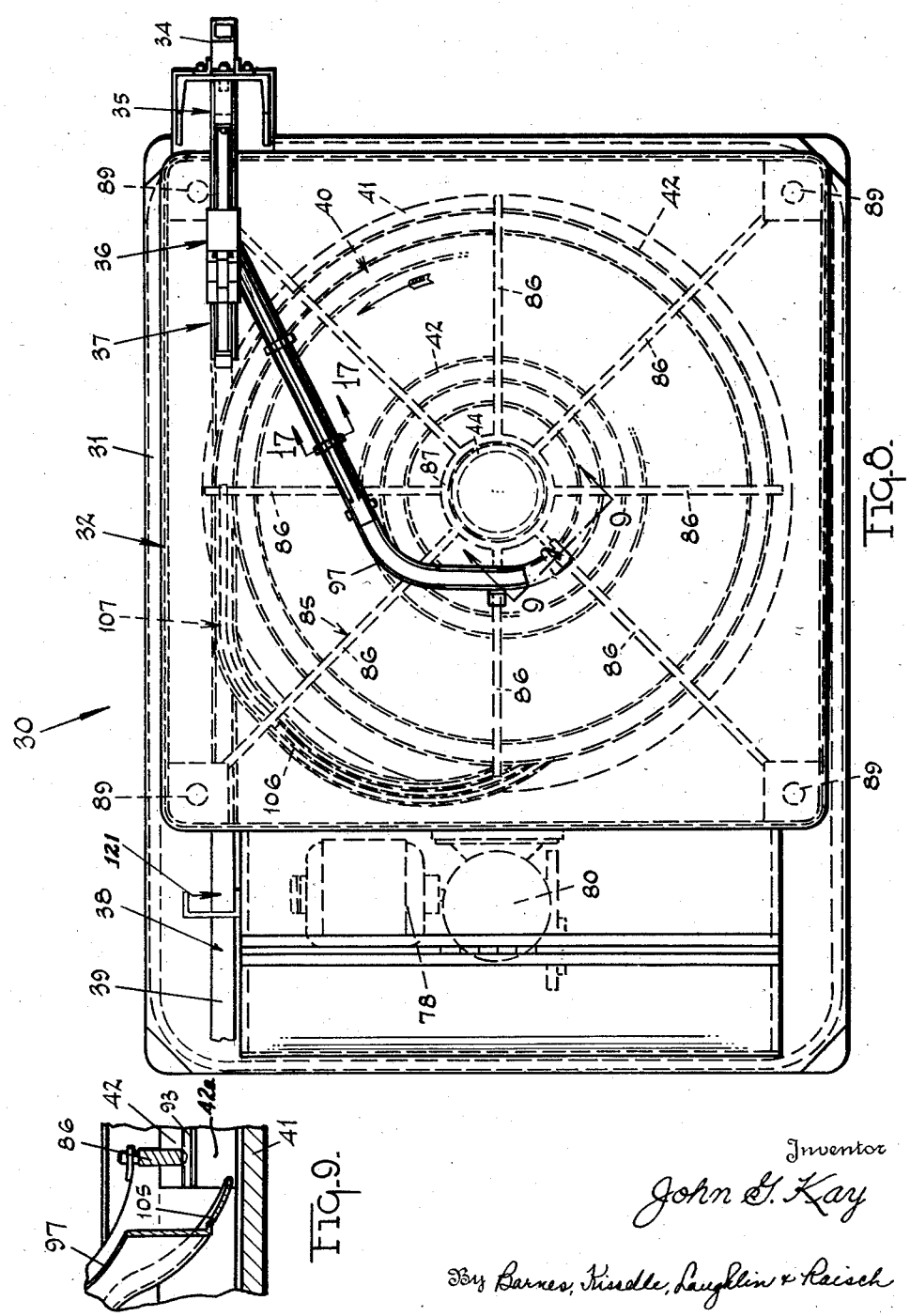

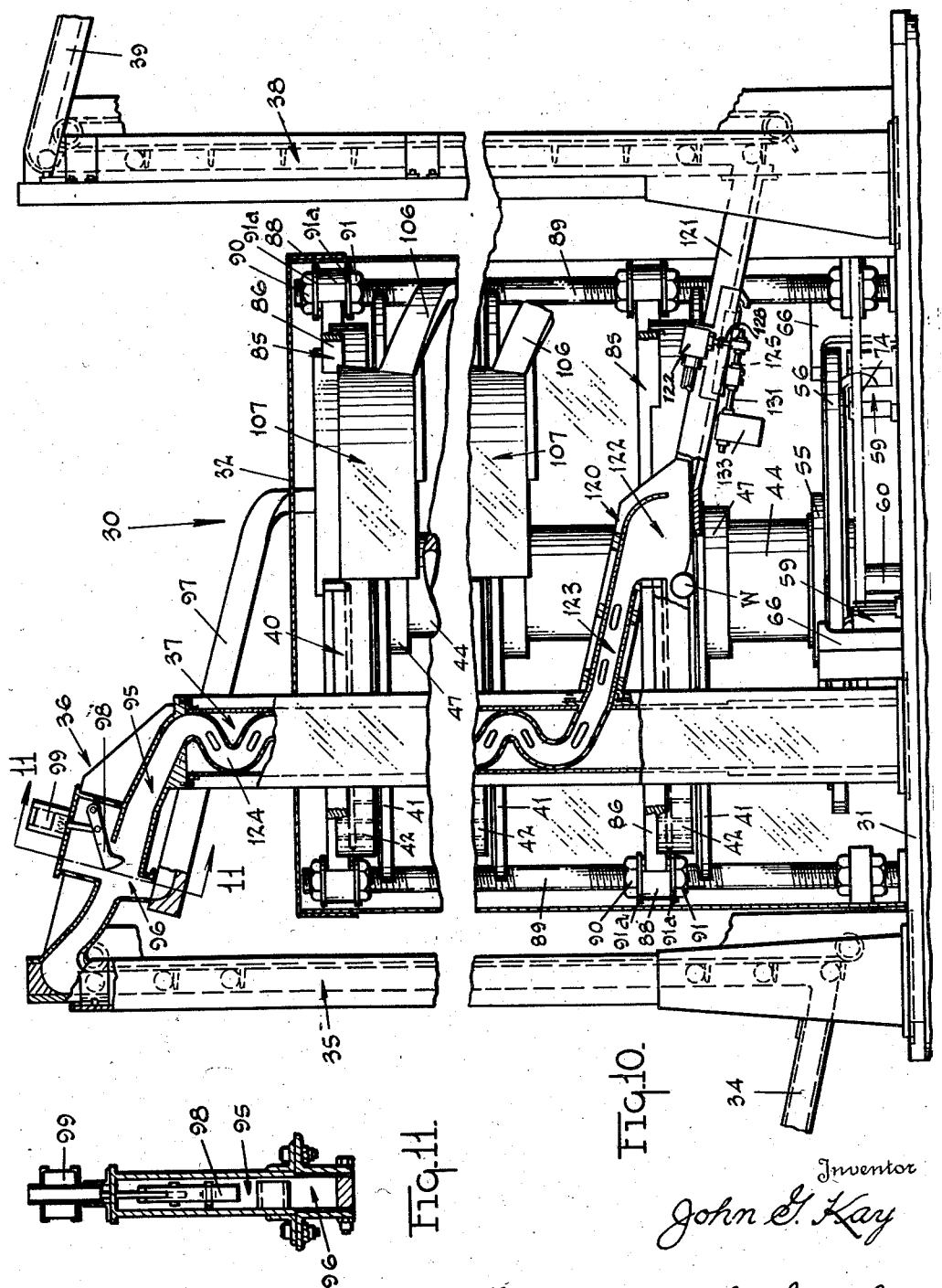

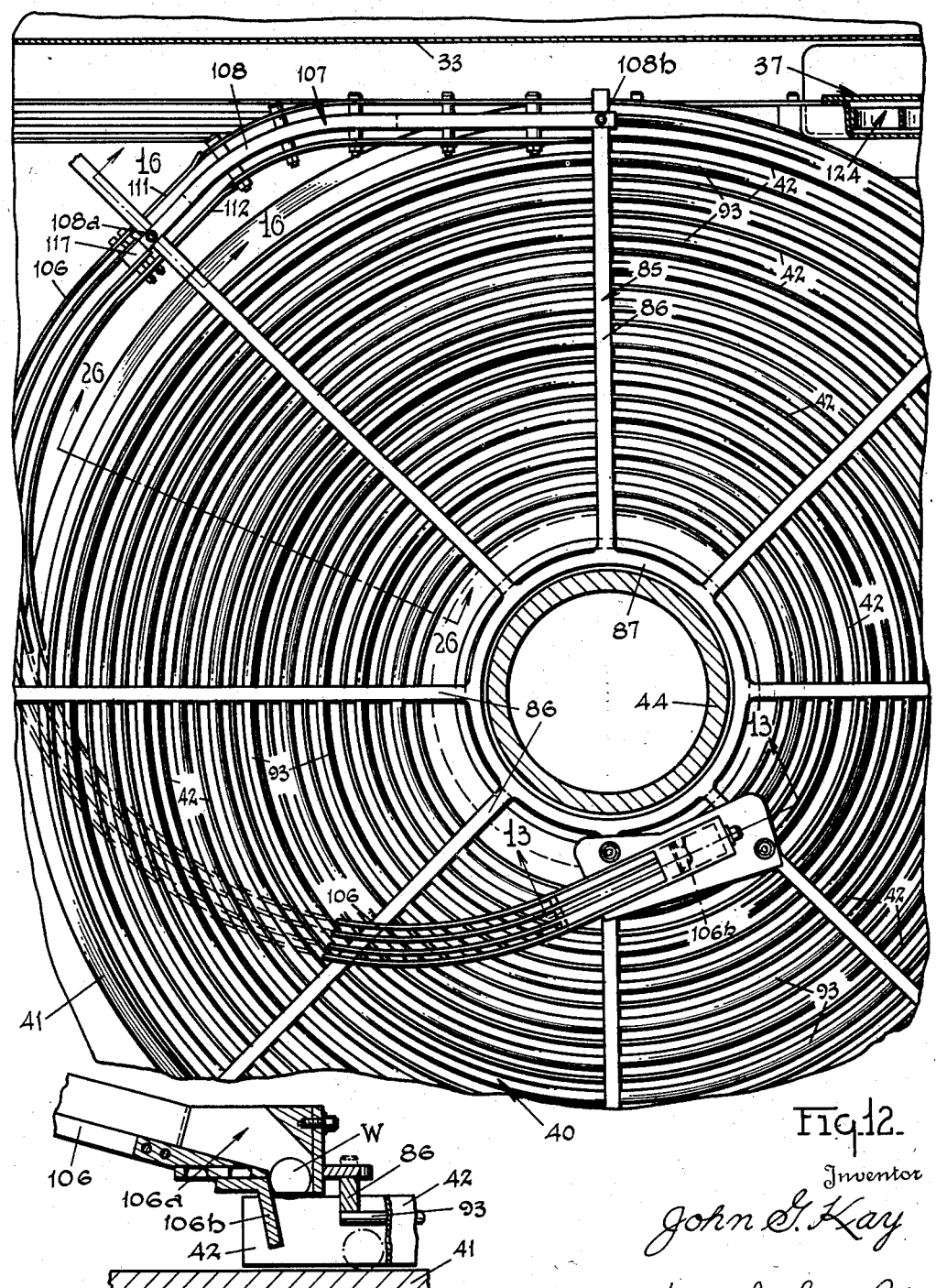

Feb. 10, 1959 J. G. KAY 2,873,020
STORAGE AND DELIVERY APPARATUS
Filed Nov. 19, 1956 12 Sheets-Sheet 9

Inventor
John G. Kay
By Barnes, Kisselle, Laughlin & Raisch
Attorneys

Feb. 10, 1959     J. G. KAY     2,873,020
STORAGE AND DELIVERY APPARATUS
Filed Nov. 19, 1956     12 Sheets-Sheet 10
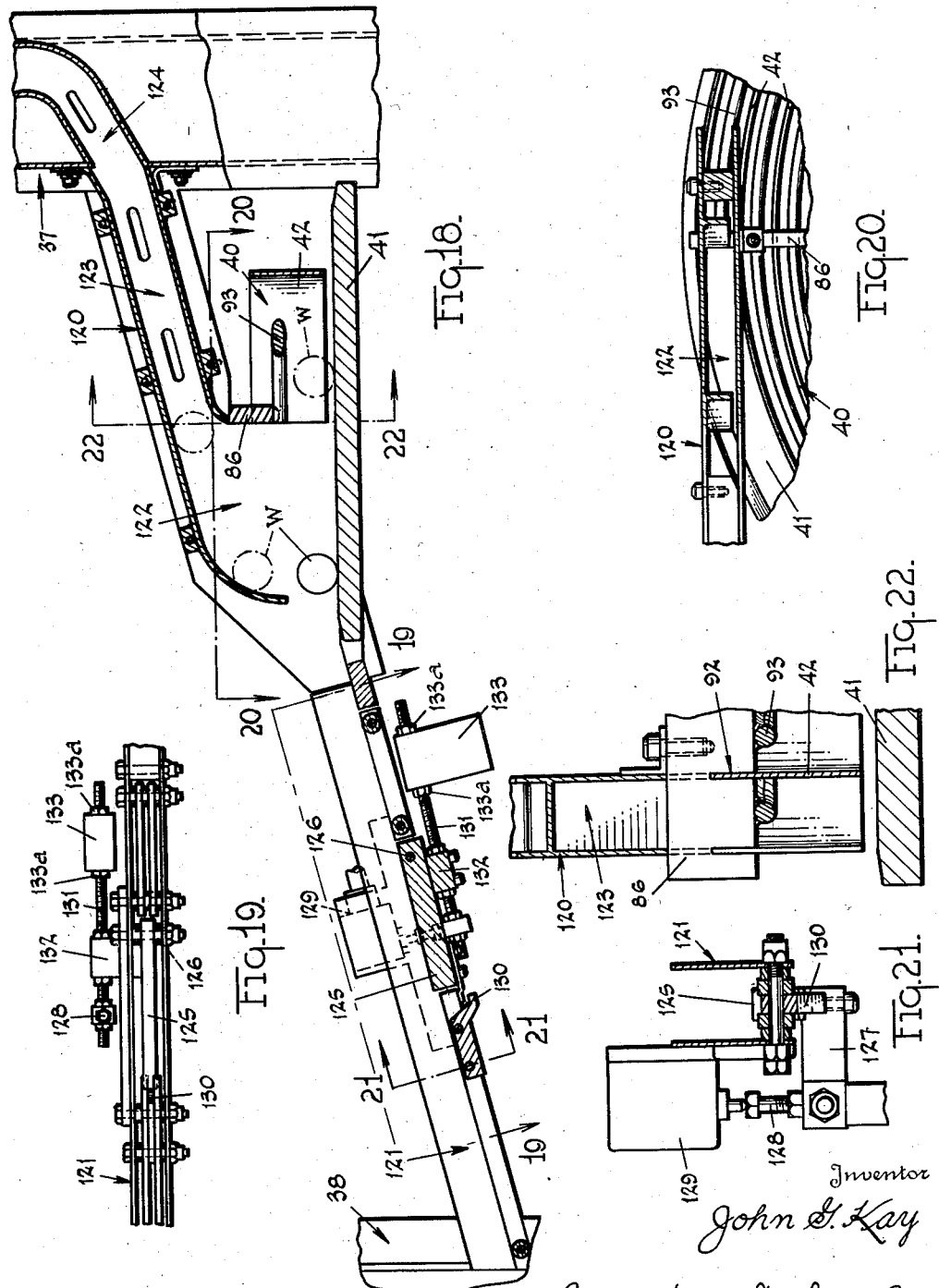
Inventor
John G. Kay
By Barnes, Kisselle, Laughlin & Raisch
Attorneys Inventor
John G. Kay
By Barnes, Kisselle, Laughlin & Raisch
Attorneys Feb. 10, 1959 J. G. KAY 2,873,020
STORAGE AND DELIVERY APPARATUS
Filed Nov. 19, 1956 12 Sheets-Sheet 12

Inventor
John G. Kay
By Barnes, Kisselle, Laughlin & Raisch
Attorneys

United States Patent Office 2,873,020
Patented Feb. 10, 1959

2,873,020
STORAGE AND DELIVERY APPARATUS

John G. Kay, Detroit, Mich., assignor to F. Joseph Lamb Company, Detroit, Mich., a corporation of Michigan Application November 19, 1956, Serial No. 623,164

28 Claims. (Cl. 198—103)

This invention relates to storage and delivery apparatus and particularly to an apparatus for receiving work pieces from one machine, storing said work pieces and delivering said work pieces to another machine as required.

In the manufacture of various assemblies it has been recently suggested that the manufacture of component parts or work pieces as well as the assembly of these work pieces may be accomplished by moving the work pieces automatically from one machine where one operation is performed to another machine where another operation is performed. Such automatic movement has been complicated by the fact that one machine may not operate at the same rate as another. In addition, the breakdown of one machine necessitates the shutting down of the machine receiving work pieces therefrom thus making the entire series of operations dependent upon the continuous operation of each of the individual machines.

It is therefore an object of this invention to provide an apparatus for receiving work pieces from one machine, storing said work pieces, and delivering said work pieces to another machine as required.

It is a further object of this invention to provide such an apparatus wherein the apparatus will automatically supply an increased demand from the machine to which work pieces are being supplied.

It is a further object of this invention to provide such an apparatus which may be readily converted to handling work pieces of different sizes.

In the drawings:

Fig. 1 is a perspective view of the apparatus.

Fig. 2 is a diagrammatic representation of the flow of work pieces through the apparatus.

Fig. 3 is a rear elevational view of the apparatus, with a portion of the housing broken away.

Fig. 5 is a sectional view on an enlarged scale taken along the line 5—5 in Fig. 3.

Fig. 6 is a fragmentary sectional view on an enlarged scale taken along the line 6—6 in Fig. 5.

Fig. 7 is a fragmentary sectional view on an enlarged scale taken along the line 7—7 in Fig. 5.

Fig. 8 is a plan view of the apparatus, parts being broken away.

Fig. 9 is a fragmentary sectional view taken along the line 9—9 in Fig. 8.

Fig. 10 is a front elevational view of the apparatus, parts being broken away and parts being shown in section.

Fig. 11 is a sectional view taken along the line 11—11 in Fig. 10.

Fig. 12 is a fragmentary sectional view taken along the line 12—12 in Fig. 4.

Fig. 13 is a fragmentary sectional view on an enlarged scale taken along the line 13—13 in Fig. 12.

Fig. 18 is a sectional view on an enlarged scale of a portion of the apparatus shown in Fig. 10.

Fig. 19 is a fragmentary sectional view taken along the line 19—19 in Fig. 18, the solenoid being broken away.

Fig. 20 is a fragmentary sectional view taken along the line 20—20 in Fig. 18.

Fig. 21 is a fragmentary sectional view taken along the line 21—21 in Fig. 18.

Fig. 22 is a fragmentary sectional view taken along the line 22—22 in Fig. 18.

Figure 4:
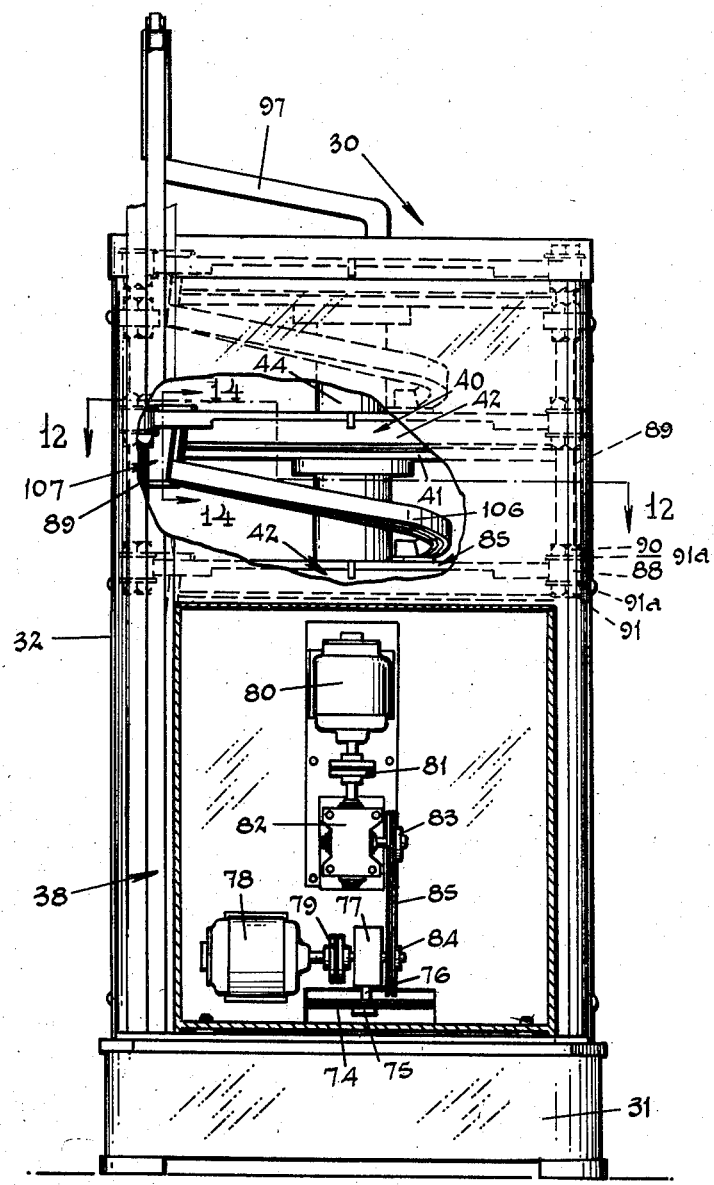
Fig. 4 is a side elevational view of the apparatus, with a portion of the housing broken away.

Referring to Fig. 1, apparatus 30 comprises base 31 and a housing 32 surrounding the major portion of the apparatus. Housing 32 has an access door 33 at the front side thereof. Work pieces are directed to apparatus 30, from a preceding machine which has performed an operation on the work pieces, for example, by suitable means such as a downwardly inclined conveyor 34. The work pieces are elevated by an elevator 35 to a distributor 36. Distributor 36 directs the work pieces to storage units 40 (Figs. 3, 10) or to a bypass unit 37. Work pieces from storage units 40 and bypass unit 37 are then elevated by a second elevator 38 to a downwardly inclined chute or conveyor 39 which directs the work pieces to another machine for performing the next succeeding operation. Elevators 35 and 38 may be of any well-known type, for example, of the type which utilizes an endless chain having work piece holding buckets or fingers at spaced points along the length thereof which are adapted to elevate the work pieces.

Figure 25:
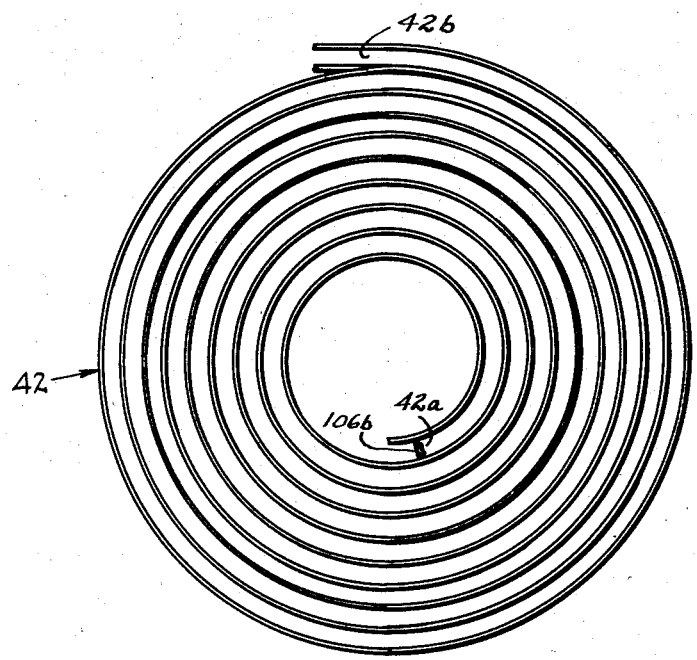
Fig. 25 is a view of the spiral guide taken along the line 25—25 in Fig. 7, the supporting arms, spiral rod and the table being broken away.
Figure 26:
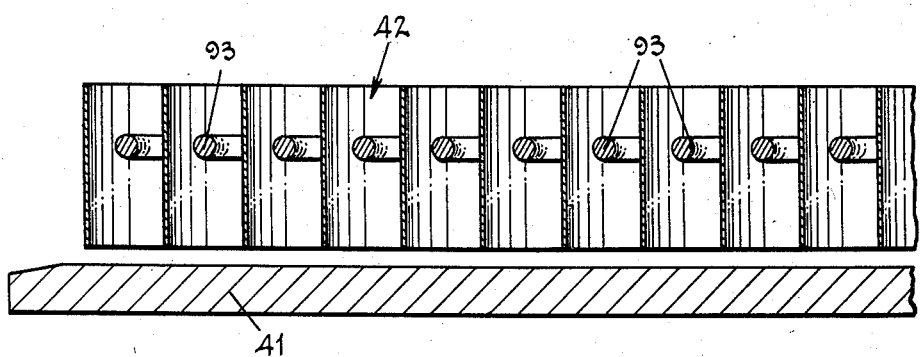
Fig. 26 is a fragmentary sectional view on an enlarged scale taken along the line 26—26 in Fig. 12.

Each storage unit 40 comprises a rotating horizontal table 41 moving below a fixed horizontal spiral guide or web 42. Work pieces are fed to the innermost end 42a of spiral guide 42 and are carried by rotating table 41 to the outermost end 42b of spiral guide 42 (Fig. 25). Work pieces for one storage unit 40 are delivered to the storage unit therebelow by a connecting track section 106, as more fully described hereinafter.

Referring to Fig. 7, each rotating table 41 is mounted on a column 44. Specifically, a hub 45 individual to each table 41 is mounted on column 44 and held in position by a set screw 46. Hub 45 is provided with a flange 47 on which an annular bearing 48 which also has a flange 49 is mounted. Table 41 rests on bearing 48. A bracket 50 is mounted on the under side of table 41 by means of bolts 51 and a friction plug 52 urged upwardly by spring 52a projects upwardly from bracket 50 into contact with the lower surface of flange 47 on hub 45. The frictional force between friction plug 52 and the lower surface of flange 47 provides a frictional driving connection between column 44 and table 41. The degree of friction between plug 52 and flange 47 may be adjusted by changing the tension of plug spring 52a as by an adjusting screw 53, which is threaded into the lower end of bracket 50 and projects upwardly into contact with plug spring 52a. The position of adjusting screw 53 may be locked by means of a nut 54 on screw 53. A channel 47a is provided in flanges 47 and 49 and a lubricating fitting 47b is provided on the end thereof to provide a means for lubricating the contacting surfaces between table 41 and bearing 48.

Column 44 has a flange 55 on the lower end thereof. Column 44 is mounted on plate 56 by bolts 57 and dowel pins 58 extending through flange 55. Plate 56 is supported for rotation about a vertical shaft 60 by rollers 65. Shaft 60 is mounted in base 31 and plate 56 is journalled on the upper end of shaft 60 by a bearing 61 seated in a socket 62 at the center of plate 56.

As shown in Figs. 5 and 6, each roller 65 is mounted in a roller assembly 59. Each roller assembly 59 comprises a yoke 63 which supports a shaft 64 and a roller 65 rotatably mounted on shaft 64. The axis of the shaft 64 extends generally radially away from the center of vertical shaft 60. As shown in Fig. 5, three roller assemblies 59 are used to support table 56 and column 44.

In order that plate 56 may be locked against movement during shipment of the apparatus, a bracket 66 is mounted on base 31 adjacent each roller assembly 59. Each bracket 66 has a projection 67 extending into overlying relationship with the periphery of plate 56. Plate 56 is provided with vertical threaded holes 68 at circumferentially spaced points corresponding to the position of brackets 66 and in vertical alignment with threaded openings 69 in projection 67 of brackets 66. During shipment a bolt 70 may be threaded into openings 69, 68 to lock plate 56 and, in turn, column 44 against rotation relative to base 31 of the apparatus.

As shown in Fig. 7, a sprocket 71 is mounted on the hub 72 on the under surface of plate 56 by bolts 73. Sprocket 71 is driven by an endless chain 74 trained over sprocket 71 and a sprocket 75 which is mounted on the lower end of an output shaft 76 projecting downwardly from a gear box 77 (Fig. 4). Gear box 77 is mounted on base 31 beyond the periphery of plate 56 (Fig. 3). An electric motor 78 is connected to an input shaft of gear box 77 by means of a coupling 79. A second electric motor 80 is connected by coupling 81 to one-way clutch 82. Clutch 82 is connected to a second input shaft to gear box 77 by pulleys 83, 84 over which an endless belt 85 is trained (Figs. 3, 4). Clutch 82 is preferably of the one-way mechanical type and is operable as more fully described hereinafter to connect the drive from motor 80 to gear box 77. Motor 78 rotates at a slower speed than motor 80 so that when the drive from motor 80 is connected to gear box 77, the drive from motor 80 takes over and rotates output shaft 76 at a greater rate of speed. This causes column 44 and tables 41 to be rotated at a greater speed through sprockets 75, 71 and endless chain 74.

As shown in Figs. 3, 4, 10 and 12, each of the spiral guides 42 is mounted in fixed position on the apparatus by means of a spider unit 85 comprising arms 86 extending radially from a ring 87 which surrounds and is spaced from column 44. Four of the arms 86 have hubs 88 on the outer ends thereof through which threaded upright posts 89 project. As shown in Fig. 10, four vertical posts 89 are mounted on base 31. The vertical spacing of each spider unit 85 relative to its respective table 41 is adjustably maintained by lock nuts 90, 91 threaded on each of the posts 89 above and below hubs 88. Washers 91a are positioned between lock nuts 90, 91 and hubs 88.

Figure 15:
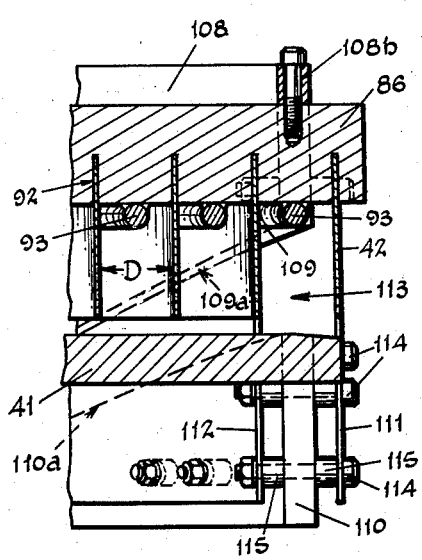
Fig. 15 is a fragmentary sectional view on an enlarged scale taken along the line 15—15 in Fig. 14.

As shown in Figs. 12 and 15, spiral guide 42 comprises a web or ribbon of sheet material wound in the form of a spiral and mounted on the under side of arms 86 preferably by being press fitted into slots 92. The spacing D between successive convolutions of each spiral guide 42 is slightly greater than the width of the work pieces being handled. In order to prevent the work pieces from being pushed upwardly out of spiral guide 42 and thereby override, a spiral rod 93 is positioned between adjacent convolutions of spiral guide 42 and provides a continuous stop against upward movement of a work piece within the convolutions of spiral guide 42. As shown in Fig. 15 spiral rod 93 is welded on the under surface of arms 86.

Referring to Figs. 8 and 10 and as previously described, work pieces from elevator 35 are fed to a distributor 36 and thereafter either to the uppermost storage unit 40 or to bypass chute 37. As shown in Fig. 10, distributor 36 has a chute 95 which communicates with the upper end of elevator 35 and with the upper end of bypass chute 37. Chute 95 is provided with a downwardly extending opening 96 which communicates with a track section 97 extending down in a curved path to the inner end of the spiral guide 42 on the uppermost spiral storage unit 40. A deflector arm 98 is pivotally mounted for movement about a horizontal axis within distributor 36 and normally extends into chute 95 thereby deflecting work pieces through opening 96 and down track section 97 to the uppermost spiral storage unit 40. When there are no pieces available to the machine which is being supplied by the storage apparatus, as when the storage units 40 are empty of work pieces, all the work pieces coming into the apparatus are bypassed directly to the machine which is being supplied. To accomplish this, deflector arm 98 is pivoted upwardly by solenoid 99 to permit the work pieces to pass across opening 96 and continue through chute 95 and down bypass chute 37 to bypass the apparatus, as more fully described below. Chute 95 slopes downwardly and is shaped such that with arm 98 in the raised position the velocity of the work pieces is sufficient to enable them to roll past opening 96 without dropping through the opening. Track section 97 is curved as shown in Fig. 8 to direct the work pieces downwardly toward the inner end 42a, that is, the inlet, of the spiral guide 42 on the uppermost storage unit 40.

Figure 17:
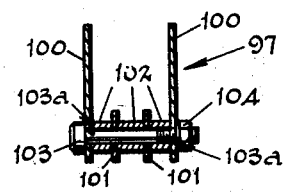
Fig. 17 is a sectional view on an enlarged scale taken along the line 17—17 in Fig. 8.

As shown in Fig. 17, track section 97 includes upright strips 100 of equal height forming the side wall thereof and intermediate upright strips 101 forming the bottom wall thereof. Strips 100 and 101 are spaced from each other by spacers 102 and are held in assembled relationship by bolts 103 passing through spacers 102 and openings 103a in strips 100 and nuts 104 threaded on bolts 103. The strips 100 and 101 are preferably formed from flat spring stock, but they may be formed from any suitable material such as cold rolled steel, hot rolled steel, nylon, plastic, fiber, stainless steel or spring steel. The width of track section 97 may be changed by changing the size of spacers 102. Track sections 106 and 121 which are presently described are of identical construction to track section 97. The openings in strips 100, 101 through which bolts 103 extend are elongated in a direction longitudinally of these track sections (see Fig. 14). By this construction, the track sections may be bent to the desired curvature prior to tightening nuts 104 on bolts 103 and then by tightening nuts 104, the parts of the track sections are maintained in the curved relationship to which they have been bent.

As shown in Figs. 8 and 9, the lower end of track section 97 supports a curved bottom plate 105 which directs the work pieces into the inner end 42a of uppermost spiral guide 42.

As table 41 rotates, the work pieces are carried by the table around spiral guide 42 through successive convolutions thereof to the outer convolution whereupon they are delivered to a track section 106 which conveys the work pieces to the inner convolution of spiral guide 42 of the storage unit 40 immediately below. The work pieces are then similarly moved through the second storage unit from the inner convolution to the outer convolution thereof and are fed to the next successive storage unit by another track section 106. As shown in Fig. 13, the lower end of track section 106 has an outlet 106a which is defined in part by a deflector plate 106b that projects downwardly into the inlet end of the convolution formed by spiral guide 42. As a work piece W moves downwardly by gravity through outlet 106a, a horizontal motion is imparted thereto to insure that it will move away from a position below the outlet and thus prevent stacking which might otherwise occur by successive work pieces jamming on top of a work piece below said outlet.

Figure 14:
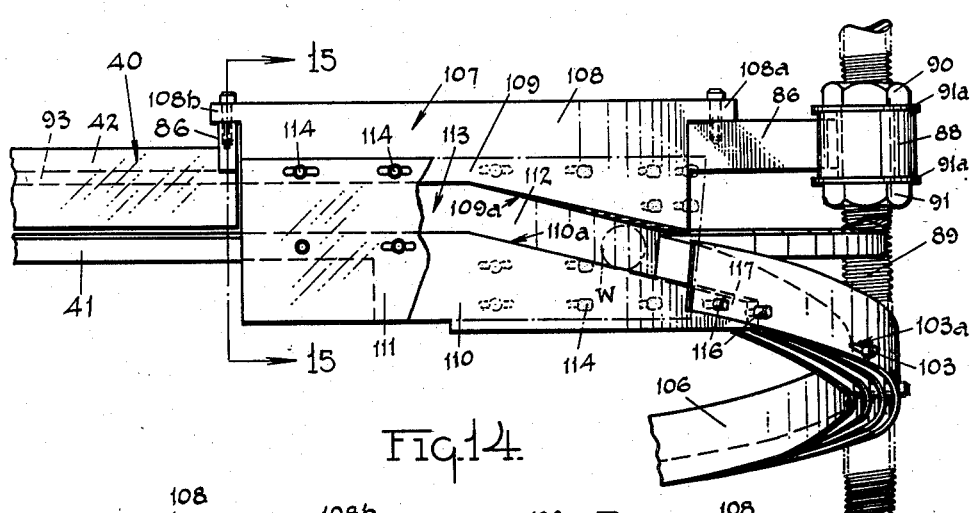
Fig. 14 is a fragmentary front elevational view taken along the line 14—14 in Fig. 4.
Figure 16:
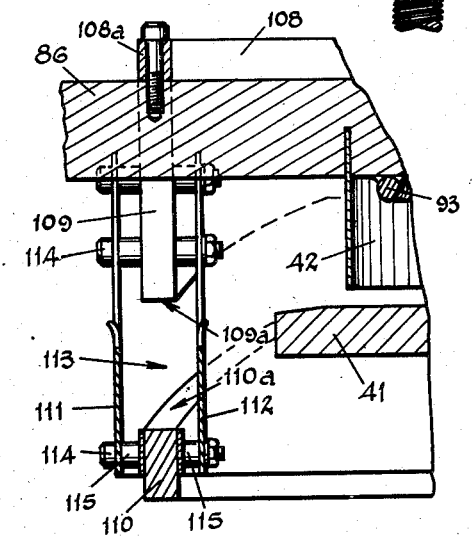
Fig. 16 is a fragmentary sectional view on an enlarged scale taken along the line 16—16 in Fig. 12.

Referring to Figs. 4 and 10, the means by which the work pieces are guided from one storage unit to the track section 106 which guides the work pieces to the next successive storage unit comprises guide assembly 107. As shown in Figs. 14, 15 and 16, assembly 107 comprises a bar 108 having the opposite ends thereof mounted on arms 86 of spider unit 85 as at 108a and 108b (Fig. 12). Bar 108 includes an integral downwardly extending plate 109 which has a portion thereof lying in a plane generally tangent to the outermost convolution of spiral guide 42 at the outer end thereof (Fig. 12). Plate 109 supports a second plate 110 in juxtaposition therebelow by means of side walls 111, 112 which are bolted to plate 109 (Fig. 16). The adjacent edges 109a and 110a of plates 109, 110 are vertically spaced to provide an inclined channel 113 (Fig. 16) which receives work pieces from the end of the outermost convolution of spiral guide 42 and guides them to the upper end of track section 106.

Side walls 111, 112 are assembled on plates 109 and 110 by bolts 114 and are spaced as required by spacers 115 to accommodate the width of the work pieces being handled. The upper end of track section 106 is fastened to assembly 107 by bolts 116 which extend through a projection 117 on plate 110 extending into channel 106 (Fig. 14).

Referring to Figs. 10 and 18, work pieces W from the outer end of the outermost convolution of the lowermost storage unit 40 pass to a guide assembly 120 which directs them to a track section 121 which, in turn, guides the work pieces to second elevator 38. Guide assembly 120 comprises a housing which defines an area 122 adjacent the outlet of spiral guide 42 and communicating therewith and also with track section 121. The housing of guide assembly 120 also defines a passageway 123 which is inclined downwardly and has its upper end in communication with the lower end of a zig-zag passageway 124 of bypass chute 37. The lower end of passageway 123 communicates with area 122. Thus, passageway 124 of bypass chute 37 connects at its upper end with chute 95 and at its lower end with passageway 123.

Referring to Figs. 18 through 22, a portion 125 of track section 121 which receives the work pieces from the guide assembly 120 and supplies them to elevator 38 is pivotally mounted adjacent its upper end with respect to the rest of the track section about a horizontal pivot 126. This pivoted portion 125 has an arm 127 mounted thereon which extends laterally of the track and on actuating pin 128 is mounted in vertical position thereon. Actuating pin 128 is mounted in position to energize a microswitch 129 when track portion 125 pivots upwardly. A stop 130 limits the downward movement of pivoted portion 125 (Fig. 18). A rod 131 is mounted on the under surface of pivoted section 125 by a bracket 132. A counterbalance weight 133 is mounted on rod 131 and urges the pivoted portion 125 to move upwardly. The position of weight 133 on rod 131 is adjustable by means of nuts 133a threaded on rod 131.

When track section 121 is filled with work pieces, the pivoted track portion 125 is held in its downwardly pivoted position by the work pieces overbalancing the weight 133, and actuating pin 128 is moved downwardly out of engagement with microswitch 129. When, however, the machine to which work pieces are being supplied utilizes the work pieces at a rate faster than being supplied by storage units 40, thus momentarily depleting the supply from track section 121, weight 133 overbalances pivoted track portion 125 moving it upwardly and causing actuating pin 128 to close microswitch 129. This energizes solenoid 99 of distributor 36 (Fig. 10) causing deflector arm 98 to move upwardly out of chute 95. Work pieces which are being delivered by elevator 35 are then permitted to pass directly through chute 95 downwardly through zig-zag passageway 124 in bypass chute 37. From passageway 124 the work pieces travel through guide assembly 120 to track section 121, thereby bypassing the storage units 40 and immediately supplying the demand of the machine to which work pieces are being fed (Fig. 8). As soon as a supply of work pieces accumulates on track section 121, sufficient to pivot track portion 125 downwardly, solenoid 99 is deenergized and track 121 is again fed work pieces from storage units 40.

Instead of bypassing the work pieces from the storage units 40 through bypass unit 37 when pivoted track portion 125 moves upwardly due to the absence of workpieces on track portion 125, additional work pieces may be quickly supplied by causing the storage units 40 to rotate at a faster speed. In order to accomplish this, microswitch 129 which is actuated by pivoted track portion 125, instead of being connected to actuate solenoid 99, is electrically connected to energize the faster motor 80. With the latter arrangement, when pivoted track section 125 moves upwardly, microswitch 129 is closed to energize motor 80 and, in turn, drive column 44 and tables 41 at a faster rate than they are driven by motor 78. The overrunning clutch 82 permits both motors to operate simultaneously. See Fig. 4.

Figure 23:
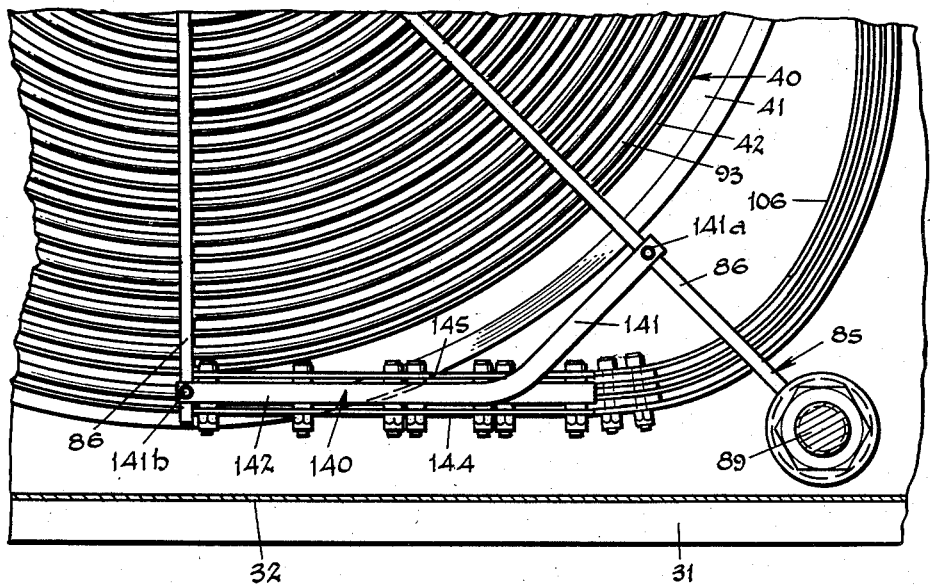
Fig. 23 is a plan view of a modified portion of the apparatus.
Figure 24:
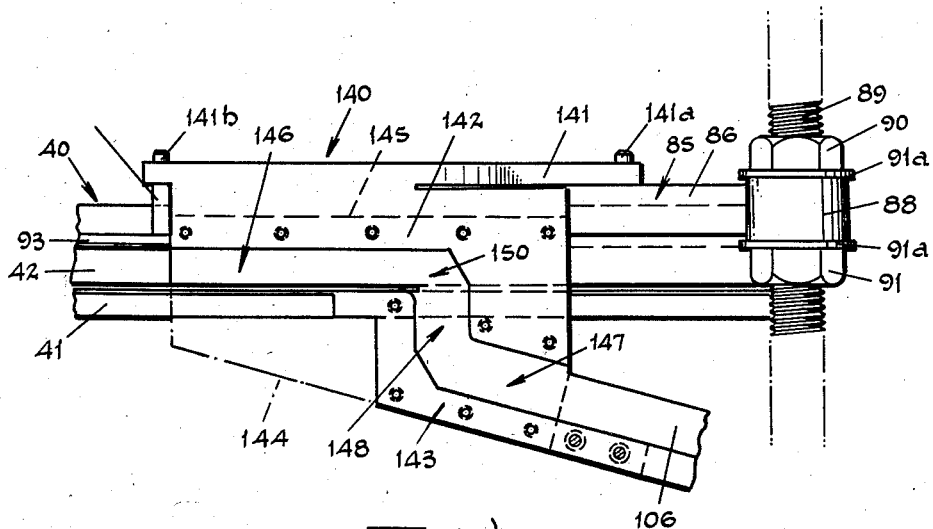
Fig. 24 is an elevational view of the portion of the apparatus shown in Fig. 23, parts being broken away.

It is, of course, obvious that when microswitch 129 is used to operate motor 80, the distributor unit 36 and bypass chute 37 may be eliminated so that track section 97 extends directly from the upper end of elevator 35 to the innermost convolution of the uppermost storage unit 40.

Where the work pieces which are being handled are accurately machined or where the work pieces are individually heavy, it is preferable that any tendency for the work pieces to become damaged by jamming one against the other should be reduced to a minimum, especially in the downwardly inclined track sections 106 which connect one storage unit 40 with the next succeeding storage unit. In such a case, it may be desirable to replace one or more guide assemblies 107 which connect the track sections 106 to the storage units with the modified guide assembly 140 shown in Figs. 23 and 24.

Assembly 140 comprises a bar 141 having the opposite ends thereof mounted on arms 86 of spider unit 85, as at 141a and 141b. Bar 141 includes an integral, downwardly extending plate 142 which has a portion thereof lying in a plane generally tangent to the outermost convolution of spiral guide 42 at the outer end thereof. Plate 142 supports a second plate 143 in juxtaposed position therebelow by means of side walls 144, 145 which are bolted to plate 142. Adjacent edges of plates 142, 143 are vertically spaced to provide a channel 150. Channel 150 includes a first substantially horizontal portion 146 and a second inclined portion 147 connected to each other by a generally vertical portion 148. By this arrangement, work pieces move from the end of spiral guide 42 through generally horizontal portion 146 and thereafter drop through generally vertical portion 148 to inclined portion 147 and onto connecting track section 106. This construction prevents the work pieces in guide assembly 140 and the spiral guide 42 from jamming against the work pieces in track section 106 and thereby damaging them.

It can thus be seen that I have provided an apparatus for receiving work pieces from a machine or operator, storing said work pieces, and delivering said work pieces to another machine as required. The apparatus automatically supplies an increased demand from the machine to which the work pieces are being supplied. Work pieces may be handled by the machine in various sizes, and in the case of cylindrical objects, either by rolling or sliding the work pieces through the apparatus. The frictional drive to each rotating plate permits a rotating plate to be stopped when foreign material becomes jammed between said plate and its respective spiral guide. The plate rotating below each spiral storage unit in spaced relationship results in an apparatus which is self-cleaning of foreign material such as small parts, chips, dirt and the like. Such foreign matter is moved outwardly and off the plates by the movement of the plates below the spiral units.

This application is a continuation-in-part of the application of John G. Kay and John K. Rye, titled "Means for Automatically Handling and Storing Workpieces," Serial No. 521,827, filed July 13, 1955, which shows an apparatus having only one spiral storage unit.

I claim:

1. In an apparatus for receiving work pieces from one machine, storing said work pieces, and thereafter delivering said work pieces to another machines as required, the combination comprising a plurality of vertically spaced storage units each having a spiral guideway thereon, each said guideway having an inlet at one end and an outlet at the other end, means for moving the work pieces through each said guideway in a direction from the inlet to the outlet, the direction of movement of said work pieces through one said guideway being the same as the direction of movement of said work pieces through the other said guideways, means for delivering work pieces to the inlet of the uppermost storage unit, means extending between the outlet of one storage unit to the inlet of the next lower storage unit and forming a guideway through which the work pieces may gravitate, said inlets being located adjacent the centers of said spiral guideways and said outlets being located at the outer ends of said spiral guideways, means for receiving the work pieces from the lowermost unit and delivering them to a machine comprising means for elevating said work pieces in succession, and an inclined track having its upper end connected to the outlet of the lowermost storage unit and its lower end connected to said latter means.

2. The combination set forth in claim 1 including bypass means for directing work pieces to said means for receiving work pieces from the outlet of said lowermost storage unit, and a distributor actuatable to direct work pieces to either said bypass means or to said means for delivering work pieces to the inlet of the uppermost storage unit.

3. The combination set forth in claim 2 including means responsive to the absence of work pieces adjacent the outlet of the lowermost storage unit to actuate the distributor such as to direct work pieces through said bypass means to said means for receiving said work pieces and delivering them to a machine.

4. The combination set forth in claim 3 wherein said bypass means comprises a chute extending downwardly from said distributor substantially directly to said means for delivering work pieces to a machine.

5. The combination set forth in claim 4 wherein said distributor includes an arm normally extending in the path of the work pieces at the upper end of said bypass chute and thereby obstructing the flow of said work pieces to said bypass chute, and a solenoid operatively connected to said arm, whereby when said solenoid is energized said arm is moved to provide unobstructed flow of work pieces to said bypass chute.

6. The combination set forth in claim 5 wherein said actuating means are positioned adjacent the outlet of the lowermost storage unit and comprise a movable track section over which the work pieces discharged from the lowermost storage unit move, means for yieldingly urging said movable section upwardly, a switch mounted adjacent to said movable section and adapted to energize said solenoid when said movable track section moves upwardly, said movable track section being arranged to move downwardly in response to the weight of work pieces thereon to deenergize said solenoid.

7. In an apparatus for receiving work pieces from one machine, storing said work pieces, and thereafter delivering said work pieces to another machine as required, the combination comprising a plurality of vertically spaced tables, means individual to each said table for supporting said table about a common vertical axis, means forming a slippable frictional driving connection between each of said supporting means and its respective table, means for positively rotating each said supporting means at the same speed and about the same vertical axis, a stationary spiral guide mounted above each of said tables with the axis thereof in alignment with the axis of rotation of said tables, and means extending between one end of the spiral guide on one table and the opposite end of the spiral guide on the next lower table for guiding work pieces from one table to the next lower table.

8. The combination set forth in claim 7 wherein said means forming a frictional driving connection between each table and each supporting means includes contacting friction surfaces on each table and its respective supporting means.

9. The combination set forth in claim 8 including means for varying the contact pressure between each set of said friction surfaces whereby to permit individual adjustment of the maximum torque exerted by said supporting means on said tables.

10. In an apparatus for receiving work pieces from one machine, storing said work pieces, and thereafter delivering said work pieces to another machine as required, the combination comprising a base, a vertical column, means for mounting said column on said base for rotation about the axis of said column, a plurality of tables having central openings therein through which said column projects, means supporting said tables in vertically spaced relationship on said column, means providing a driving connection between each table and said column, a spiral guide individual to each said table, means for mounting said spiral guide in fixed position above its respective table with the axis of said spiral guide in alignment with the axis of said column, track sections for guiding the gravity movement of work pieces from one spiral guide to the next spiral guide immediately below, and means for rotating said column about its axis and thereby rotating each said table in the same direction below its respective spiral guide and causing work pieces which are within the convolutions of said spiral guide to move toward one end of said spiral guide and thereafter through said connecting track section to the spiral guide immediately below.

11. The combination set forth in claim 10 wherein said means for mounting said column for rotational movement relative to said base comprises a plate mounted on the lower end of said column, a plurality of rollers mounted in spaced relationship on said base and having the axes thereof extending generally horizontally and radially from the axis of said column, said plate resting on said rollers, and means for preventing the lateral movement of said column relative to said base.

12. The combination set forth in claim 11 wherein said latter means comprises a vertical shaft mounted in said base and extending upwardly, and a bearing on said column into which the upper end of said shaft extends.

13. The combination set forth in claim 10 wherein said means for rotating said column comprises a sprocket mounted in horizontal position on the lower end of said column, a second sprocket mounted on said base in horizontally spaced relationship to said first sprocket, an endless chain trained over said sprockets, and means for rotating said second sprocket.

14. The combination set forth in claim 10 wherein said means for supporting said tables on said column comprises a plurality of annular members mounted on said column in vertically spaced relation, and means on each annular member providing a bearing surface, each said table resting on said bearing surface of one of said annular members.

15. The combination set forth in claim 14 wherein said means for forming a driving connection between said tables and said column comprises an annular friction surface on the under side of each annular member, and a friction member mounted on each table and extending upwardly into contact with said friction surface.

16. The combination set forth in claim 15 including means for varying the pressure between said friction member on each said table and said friction surface on each said annular member, thereby controlling the friction force between said friction surface and said friction member.

17. The combination set forth in claim 10 including means for vertically adjusting the position of each said spiral guide relative to its respective table.

18. The combination set forth in claim 16 wherein said means for supporting each said spiral guide comprises a ring surrounding said column and a plurality of radially extending arms fixed to said ring, means for mounting each said spiral guide on said arms, hubs formed on the ends of some of said arms, vertical shafts mounted on said base at points spaced radially from the axis of said column and extending upwardly through said hubs, and means for mounting said hubs in vertical position on said vertical shafts.

19. In an apparatus for receiving work pieces from one machine, storing said work pieces, and thereafter delivering said work pieces to another machine as required, the combination comprising a plurality of tables, means for rotatably supporting said tables in vertically spaced relationship, a vertically disposed support, a spiral guide individual to each said table mounted on said vertical support above its respective table, means for vertically adjusting each said spiral guide on said vertical support, track sections for guiding the gravity movement of work pieces from one spiral guide to the next spiral guide immediately below, and means for rotating said tables about their axes and thereby rotating each said table below its respective spiral guide and causing work pieces which are within the convolutions of said spiral guide to move toward one end of said spiral guide and thereafter through said connecting track section to the spiral guide immediately below.

20. In an apparatus for receiving work pieces from one machine, storing said work pieces, and thereafter delivering said work pieces to another machine as required, the combination comprising a plurality of vertically spaced storage units, each said storage unit having an inlet and an outlet and being so constructed and arranged that work pieces are received at the center thereof and successively moved outwardly in a horizontal spiral path and thereafter discharged through said outlet, means extending from the outlet of one storage unit for guiding the movement of the work pieces by gravity from said storage unit to the inlet of the next successive storage unit, means for receiving the work pieces discharged from the lowermost unit and delivering said work pieces to another machine, and means responsive to the absence of work pieces adjacent the outlet of said lowermost unit for increasing the speed of movement of said work pieces through said storage units.

21. In an apparatus for receiving work pieces from one machine, storing said work pieces, and thereafter delivering said work pieces to another machine as required, the combination comprising a plurality of vertically spaced tables, means individual to each said table for supporting said table about a common vertical axis, means forming a slippable frictional driving connection between said latter means and its respective table, means for positively rotating each said supporting means at the same speed and about the same vertical axis, a spiral guide mounted in fixed position above each of said tables with the axis thereof in alignment with the axis of rotation of said tables, means extending between one said spiral guide and the next spiral guide vertically below for guiding work pieces from one table to the next successive table, and means responsive to the absence of work pieces adjacent the discharge of said lowermost table for rotating said supporting means at an increased speed.

22. In an apparatus for receiving work pieces from one machine, storing said work pieces, and thereafter delivering said work pieces to another machine as required, the combination comprising a base, a vertical column, means for mounting said column on said base for rotation about the axis of said column, means for rotating said column, a plurality of tables, means supporting said tables in vertically spaced relationship on said column, means individual to each said table and providing a driving connection between said table and said column, a spiral guide individual to each said table, means for mounting said spiral guide in fixed position above its respective table with the axis of said spiral in alignment with the axis of said column, track sections for guiding the gravity movement of work pieces from one spiral guide to the next spiral guide immediately below, means for rotating said column about its axis and thereby rotating each said table in the same direction below its respective spiral guide and causing work pieces which are within the convolutions of said spiral guide to move toward one end of said spiral guide and thereafter through said connecting chute to the spiral guide immediately below, and means responsive to the absence of work pieces adjacent the discharge of said lowermost table for rotating said column at an increased speed.

23. In an apparatus for receiving work pieces from one machine, storing said work pieces, and thereafter delivering said work pieces to another machine as required, the combination comprising a plurality of vertically spaced storage units each having a spiral guideway thereon, each said guideway having an inlet at one end and an outlet at the other end, means for moving the work pieces through each said guideway in a direction from the inlet to the outlet, the direction of movement of said work pieces through one said guideway being the same as the direction of movement of said work pieces through the other said guideways, means for delivering work pieces to the inlet of the uppermost storage unit, means extending between the outlet of one storage unit to the inlet of the next lower storage unit and forming a guideway through which the work pieces may gravitate, said inlets being located adjacent the centers of said spiral guideways and said outlets being located at the outer ends of said spiral guideways, means for receiving the work pieces from the lowermost unit and delivering them to a machine comprising means for elevating said work pieces in succession, and a track having its one end connected to the outlet of the lowermost storage unit and its other end connected to said latter means.

24. The combination set forth in claim 23 including means for bypassing said vertically spaced storage units and a distributor actuatable to direct work pieces to either said bypass means or to said means for delivering work pieces to the inlet of the uppermost storage unit.

25. The combination set forth in claim 24 including means responsive to the absence of work pieces adjacent the outlet of the lowermost storage unit to actuate the distributor such as to direct work pieces to said bypass means.

26. The combination set forth in claim 23 including means for bypassing said vertically spaced storage units between the inlet of the uppermost storage unit and the means for receiving the work pieces and elevating the work pieces, and a distributor actuatable to direct work pieces to either said bypass means or to said means for delivering work pieces to the inlet of the uppermost storage unit.

27. In an apparatus for receiving work pieces from one machine, storing said work pieces, and thereafter delivering said work pieces to another machine as required, the combination comprising a base, a vertical column, means for mounting said column on said base for rotation about the axis of said column, a plurality of tables having central openings therein through which said column projects, means supporting said tables in vertically spaced relationship on said column, means providing a frictional driving connection between each table and said column, a spiral guide individual to each said table, means for mounting said spiral guide in fixed position above its respective table with the axis of said spiral guide in alignment with the axis of said column, track sections for guiding the gravity movement of work pieces from one spiral guide to the next spiral guide immediately below, and means for rotating said column about its axis and thereby rotating each said table in the same direction below its respective spiral guide and causing work pieces which are within the convolutions of said spiral guide to move toward one end of said spiral guide and thereafter through said connecting track section to the spiral guide immediately below.

28. The combination set forth in claim 10 wherein said means for supporting each said spiral guide comprises a plurality of radially extending arms having their inner ends terminating adjacent said column, means for mounting each said spiral guide on said arms, and means on said base for adjustably engaging at least some of said arms adjacent their outer ends to hold said spiral guide in vertical position.

References Cited in the file of this patent

UNITED STATES PATENTS

| | | |
|---|---|---|
| 1,225,172 | Privett | May 18, 1917 |
| 1,508,827 | Valiquet | Sept. 16, 1924 |
| 2,599,221 | Bergmann | June 3, 1952 |